United States Patent [19]

Jonsson

[11] Patent Number: 4,751,787

[45] Date of Patent: Jun. 21, 1988

[54] TRACK AND CHANNEL FOR BAITED AND UNBAITED LONG-LINE

[76] Inventor: Sigurbjoern A. Jonsson, Kvistaland 14., Reykjavik, 108, Iceland

[21] Appl. No.: 16,418

[22] Filed: Feb. 18, 1987

[51] Int. Cl.⁴ .................. A01K 79/00; A01K 83/00
[52] U.S. Cl. .................................. 43/4; 43/27.4
[58] Field of Search ............ 43/4, 27.2, 44.83, 57.2, 43/57.3

[56] References Cited

U.S. PATENT DOCUMENTS

| | | | |
|---|---|---|---|
| 2,763,089 | 9/1956 | McDonald | 43/44.83 |
| 3,983,657 | 10/1976 | Klein | 43/44.83 |
| 4,354,323 | 10/1982 | Huff | 43/4 |
| 4,437,254 | 3/1984 | Fancey et al. | 43/4 |

FOREIGN PATENT DOCUMENTS 104672  9/1978  Japan .................... 43/27.4

Primary Examiner—M. Jordan
Attorney, Agent, or Firm—Richard C. Litman

[57] ABSTRACT

Long-line fishing gear includes a protuberance fixed about the juncture between the legs of hooks and attached snoods. The curved periphery of the protuberances cooperate with configured surfaces of spaced apart rails forming a track. The protuberances serve to support the hooks above the track and allow rotation of the supported hooks to accommodate variations in the angular disposition thereof without binding during loading, storage and discharge of the hooks from the track. In this manner, even baited hooks are readily supported by the tracks.

13 Claims, 3 Drawing Sheets

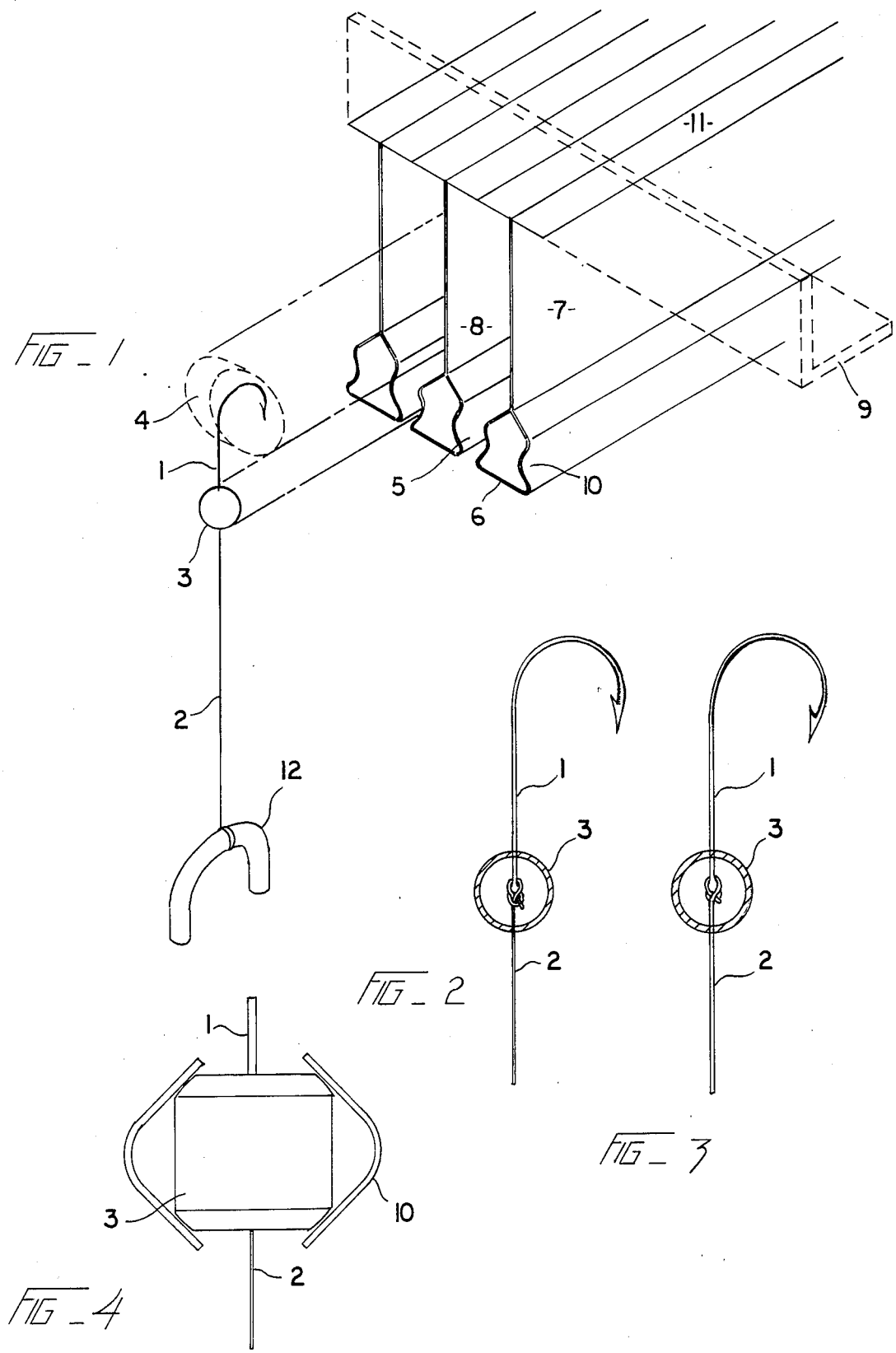

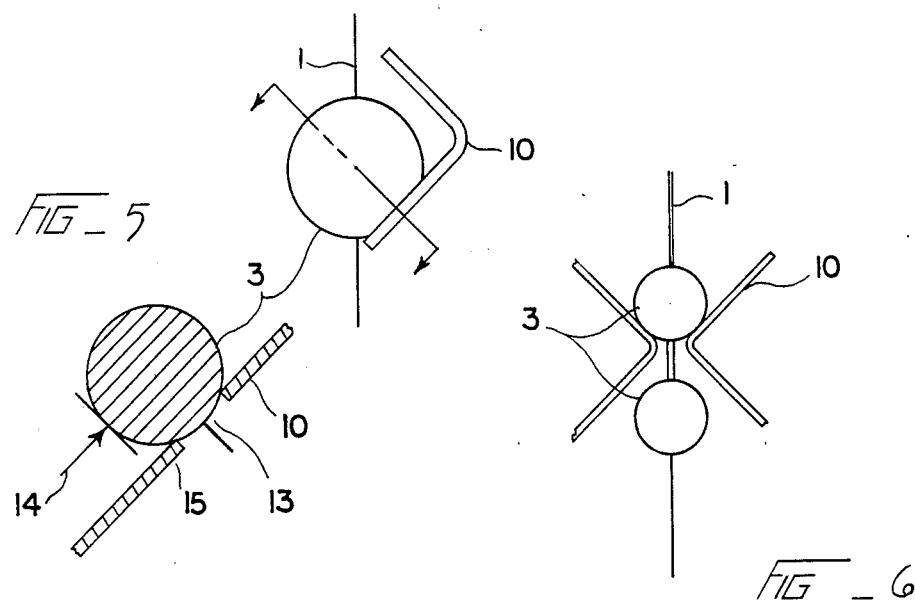
FIG_5
FIG_6
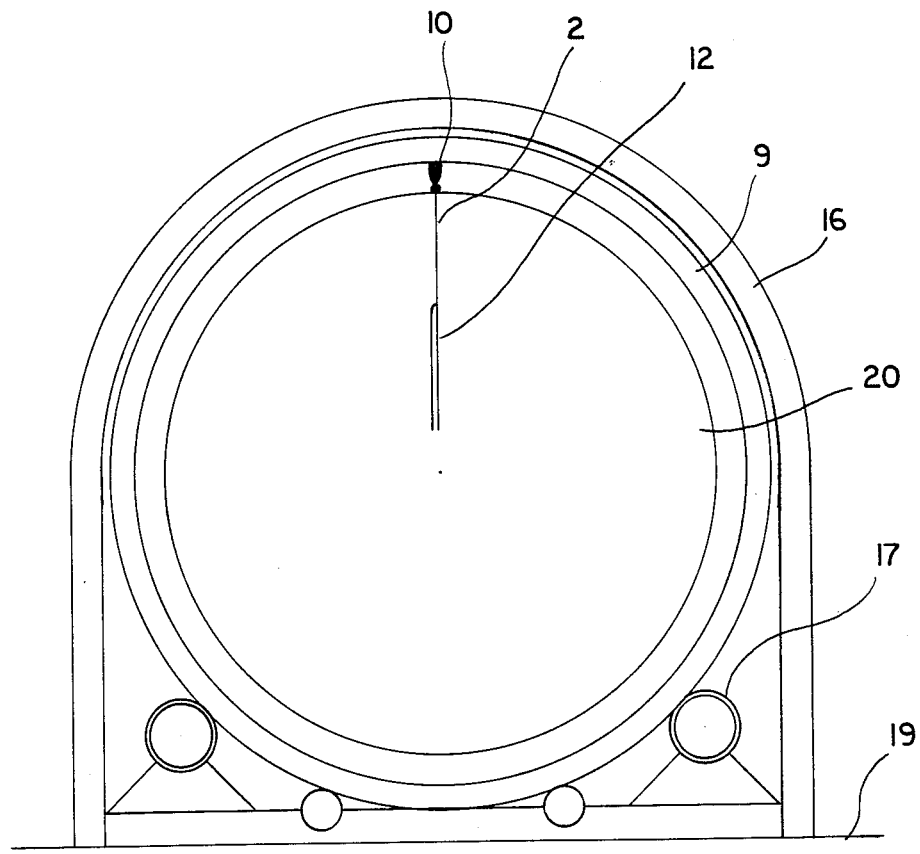
FIG_7

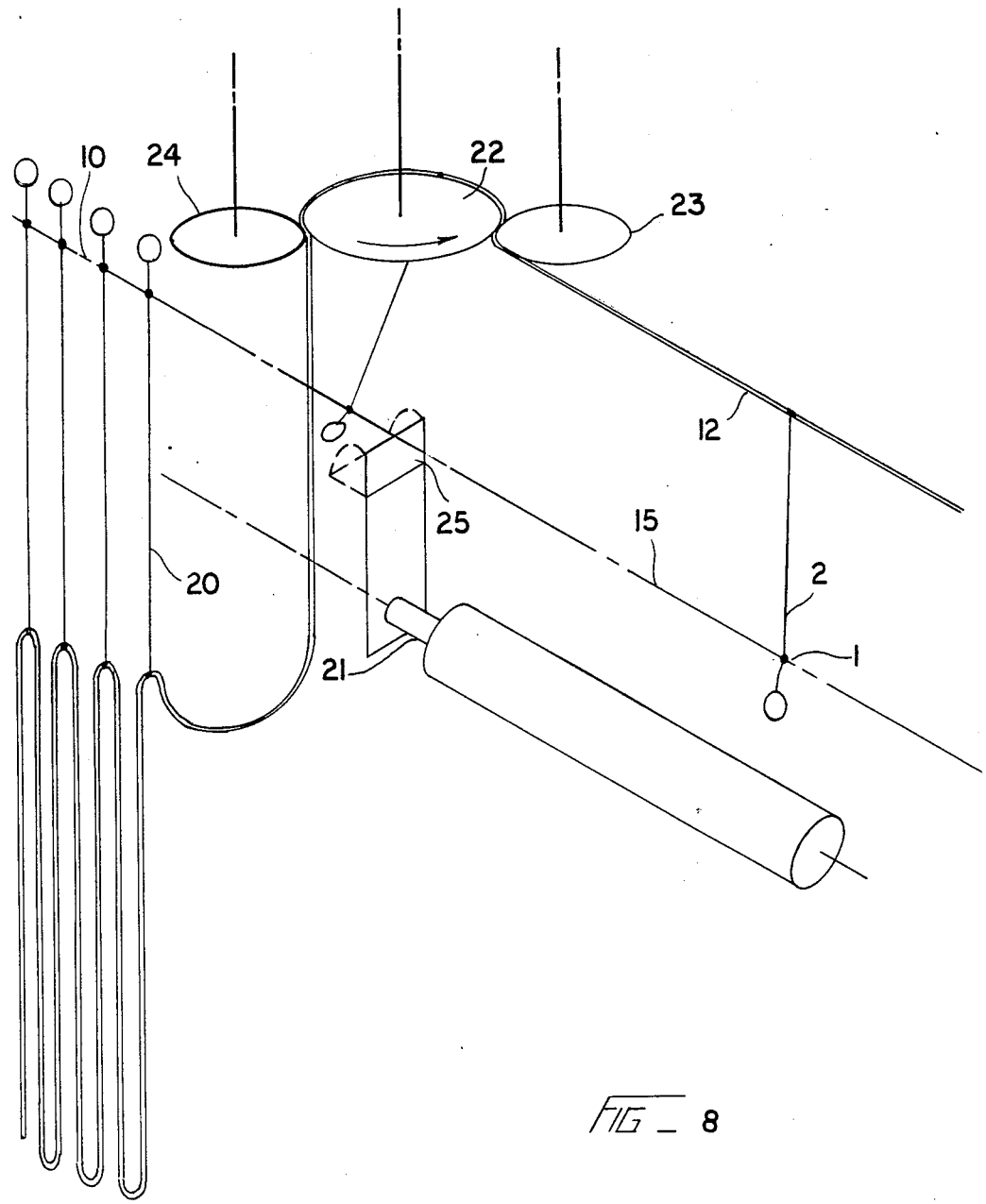
FIG_8

TRACK AND CHANNEL FOR BAITED AND UNBAITED LONG-LINE

The invention consists of a line-hook with a spherical knob at the joint of the hook and the snood. The knob slides along a track of corresponding shape and can move only in the lengthwise direction of the track. The snood and the main-line hang on the knob, but the hook protrudes upward, not touching the track and thus being capable of carrying bait without it being subject to shuffling. Thus it is possible to store a baited long-line on tracks or parts thereof which are arranged side by side so that the tracks or their parts form a plain or circular surface, a sort of drum like the magazine of a revolver. The fishing line is hauled on a sheave which hangs vertically with an empty space below the sheave. The snoods cut through this empty space when the main-line is hauled. One end of the snood is fixed to the main-line and follows it, but the other end with the hook slides along the track. Thus the long-line is hauled to the opening of the storage track where a pneumatically powered rod presses the knob in the direction of the track and into the storage track.

When the line is hauled in, de-hooking first proceedes in a known manner and thereupon the hooks are caught in a funnel to the opening of the track, thereafter being drawn along the track through equipment cleansing the remnants of bait, reforming hooks, cutting away broken snoods and replacing these by new ones and finally baiting all the hooks. As previously described the fishing line is hauled to the opening of the storage track and pushed therefrom by a pneumatic rod into the storage track.

Long-line fishing is a method widely used for all fish taking bait, except small fish. 50 centimeters long snoods are fixed to the main-line at intercepts of 100–120 cm. At intercepts of 1,000–1,500 m a plummet (sinkstone) and a float are fixed to the main-line, called marking line. The line between the marking lines represents 2-3 troughs. Large boats fishing cod around Iceland use 80 troughs or more than 30,000 hooks, getting a fish on every tenth hook and hauling half a hook per second, running out the fishing line at a speed of 6 nautical miles or 3 m/sec, 2 hooks/sec. The baiting of the fishing line occurs in two ways. The fishing line is either baited ashore and coiled in a trough out of which it will be pulled automatically over the gunwale where it takes a 90° bend with the snoods centrifuged directly upwards and the bait being slung off badly baited hooks or the line is baited as and when it is laid out and then at a speed of 2 hooks/sec. The invention consists of a new method, baiting the line as and when it is hauled in. The speed of baiting is then reduced from two to half a hook/sec. The invention also comprizes storing of the baited long-line in horizontal tracks wherefrom the hooks are pulled straight out into the sea without any bend of track.

At high baiting speed the long-line is pulled up through a funnel which is full of bait. The hook then hooks into some bait on the way up the funnel, usually so in the bottom portion of the funnel and pulls this up through the pile of bait which is present there. Thereby the bait is torn to a greater and lesser extent. Many hooks go into the sea without any bait and others are badly baited. Upon baiting speed which is merely a quarter it is possible to use a totally different method of baiting in which case the hook is pulled at a speed of 0.7 m/sec to a specific newly cut and undamaged and cold bait and aimed at the centre of the bait. The result can be just like that of the best manual baiting. It is thus clear that by baiting at the hauling in of the long-line the entire long-line fishing method is altered and the result will be in conformity therewith. A lesser baiting speed permits a totally different and more secure method of baiting and totally different bait is paid out with the hook. The bait is also pulled out in an entirely different manner. It does not make any 90° bend on the way, but slides out in a straight line. The cause of these changes is to the effect that the long-line is baited while being hauled in and stored in baited condition on horizontal tracks set lengthwise on the vessel's course. These alterations require the line to be baited while being hauled in and stored in baited condition. This has hitherto been unknown. All known baiting machines are based on the line being hauled in and cleansed and stored in unbaited condition, it being baited as and when it is laid. This is a totally different method requiring a fourfold baiting speed as compared with the method of the invention. This fourfold baiting speed is of fateful importance for the result of the fishing. The hooks become badly baited, the bait is even flung off the hook and the fish may nibble at the bait and get it off the hook instead of getting caught. This specifically applies to haddock which does not bite firmly.

BRIEF DESCRIPTION OF THE DRAWINGS

The invention will now be described by means of the following illustrations.

FIG. 1 shows the long lines stored in tracks suspended from a supporting beam.

FIGS. 2 and 3 sectional view of the globular knob and hook.

FIG. 4 shows the leg of the hook 1, the snood 2 and the knob 3 which has two spherical rings capable of forming contact points with the tracks.

FIG. 5 shows the knob in the track passing over intercept 13.

FIG. 6 shows an X track with two knobs.

FIG. 7 shows the track arranged on a supporting ring.

FIG. 8 shows the pressure wheels which press the main-line to the driving shear.

DETAILED DESCRIPTION OF THE DRAWINGS

FIG. 1 shows a hook 1 and the snood 2 which is a nylon gut and at the joint thereof there is a globular knob 3 and corresponding track 5 marked off by a circular rail 10 in the track-rails 6 which are held up by the beams 7 which are linked by means of the flanges 11 to the supporting beam 9. The beams 7 and the supporting rails 6 along with the flanges 11 form the hook-housing 8. The globular knob 3 shifts into the globular track 5 and rests on the rail 10 in the track-rails 6 and can move in the direction of the track only. The hook 1 simultaneously moves with the bait 4 into the hook-housing 8. The snood 2 and the main-line 12 hang on the globular knob 3 and the entire weight rests on the rail beams 7. The track is open at both ends so that following baiting the hook may be entered into one end thereof and let slide out through the other end when the fishing line is laid in the sea.

FIG. 2 shows the snood 2 knotted to the eye of the hook 1 and the knob 3 cast around the eye and the knot. The knob is made of nylon. FIG. 3 shows the hook 1 where the snood 2 is not knotted to the hook, but laid around its leg and fused together by means of heating and even melted to the leg of the hook or the head so that snood 2 and hook 1 stick together. Thereupon the globular knob 3 is cast around the joint of the hook and the snood.

It is appropriate to make the track-rails 6, the beams 7 and the flanges 11 from 1-2 millimeters aluminum, spot-welding the beams and bolting the flanges 11 to the supporting beams 9. The hollow of the track-rails 6 may be closed at the ends by means of plastic stopples.

The task of the track 5 is that of storing the hooks. The task of the storage is independent of how the hooks face, but that depends upon the bait. The knob must therefore be ring-shaped with the leg of the hook as a centre. Upon sliding along the track the knob must be able to incline on the arc tangens (tg) of $\mu$ which for nylon on aluminum is about 6° in all directions, but for moulded plastic on synthetic material up to 22° in all directions from the leg of the hook. This means that the contact surfaces of the knob at the track must be spherical surfaces in these regions. The knob shall be kept in the track irrespective of whether the hook faces upward or downward and there shall therefore be two contact surfaces above the centre and two below the centre. Due to rotation around the leg of the hook and inclination owing to frictional resistance these become top spherical rings with a central angle arc tangens of $\mu$. Other parts of the knob's surface may be of a different shape, but a spherical knob has the advantage that it is easy to clean. Rounded internal angles at the joint of hook and snood are an advantage in this respect. Thus the knob shall have two ball-rings in the contact point at the track and the central angle thereof shall be arc tg $\mu$. A spherical surface meets these conditions. The track shall form a contact surface at the knob above and below its centre, but yet not simultaneously.

FIG. 4 shows the leg of the hook 1, the snood 2 and the knob 3 which has two spherical rings capable of forming contact points with the track 10 although the hook inclines by the frictional angle between the material of the knob and the track in all directions. Upon preparation of the rails care shall be taken to avoid the formation of internal unrounded angles into which there may accumulate fat or remnants of bait and which will be difficult to cleanse. The same applies to the knob and the sphere is a suitable shape for that very reason.

The knob shall go by a rail 10 which is interrupted at the outset of the storage tracks 5. The knob must pass unhindered over this interruption or intercept which may be several millimeters. Despite the fact that the edges of the intercepts or the ends be made rounded the knob must be spherical in order to pass over the intercept. That is why spherical is the most suitable shape. All edges on the knob may cause the equipment to get stuck. FIG. 5 explains this, but it shows the spherical knob 3 pass over the intercept 13 between the approach track 15 and storage track 10. The force 14 pushes the knob into/the direction of the track.

Known long-line machines perform the following operations: Haul the line—cleanse the hooks—reform the hooks—renew snoods—arrange hooks—store hooks—bait hooks—slide out the fishing line. Reforming and renewal are manual jobs. The hooks are stored unbaited and the hook-track is a single rail on which the hook-bend or nape rests and slides. This is the place intended for the bait and cannot therefore be used for a baited hook. That is why baiting has been the last operation performed on the long-line prior to its being let into the sea. This will be subject to change by means of the invention which is a ball-track for a baited hook. The baiting now precedes the storage and a ball-rail is necessary for that purpose in order to shift and store baited hooks. According to the invention either a ball-track or a single rail may be used in a long-line machine ahead of the baiting.

A long-line machine according to the invention includes the same operations as known long-line machines, but in a different order. Instead of arranging—storing—baiting, the order will be baiting—arranging—storing.

The baiting shifts from a place where the speed of the long-line is 2 hooks per sec to a place where the speed of the line is ½ a hook per sec, in other words where the speed is a mere quarter, thus inviting another and more accurate method of baiting whereby each hook is hooked into a specific bait in a fixed manner at slow speed, but does not slide up through a pile of bait where it hooks into some bait at random or even none and will be baited at random.

Thus the invention represents a knob or ball at the joint of the hook and the snood and the pertaining ball-track for storing of the hook with bait so that the baiting may be performed upon the hauling in of the line and at slow speed which results in accurate baiting and greater catch. The invention also consists of a new method of long-line fishing. The method is characterized by the order of operations: Baiting—arranging—storing. The method requires the storing of baited hooks and the invention solves that problem by means of the ball-snood and the ball-track.

The invention provides for the ball-tracks being of a length of about 1.5 to 2 meters, or shorter than the intercept on the fishing line between two snoods plus the length of two snoods, so that there may be one hook on the end of one track and the next hook commences at the start of the next track and the tracks will be parallel. It is also being provided for that the tracks be placed in order onto a ring or a wheel, e.g. troughs 16 on a wheel of a diameter of about 2 meters, so that the deck requirement is about 0.2 sq. m/trough.

Known baiting machines consist of the hooks being arranged on horizontal cross-beams above the deck, but the invention permits the beam to travel in a circle and the hooks below on the wheel are then upside-down without becoming detached from the track. This saves two-third of the deck-space, because the wheel with diameter D has the circumference $D \times PI$. Thus the wheel has space for treble the quantity of hooks on the selfsame surface. This is naturally of practical importance, irrespective of whether baiting be undertaken upon hauling in or paying out of the long-line or whether the hooks are baited or unbaited.

A baited hook takes up about treble the space of an unbaited one and it is thus possible by means of a wheel to arrange the same quantity of baited hooks on a wheel as unbaited ones on a beam. The deck requirement remains unchanged. As it pertains to unbaited hooks it is possible by means of a wheel to save two-third of the deck-space.

The storing of bait requires cooling and for this purpose the track-wheel is arranged in an insulated housing where cooling occurs by means of cold air down to freezing point so that there is no danger of anything being frozen firm, neither the fishing line, hooks nor the bait. Thus the principal object of the invention is that of baiting upon hauling in. In order to achieve this object it is necessary to arrange and store baited hooks. That object is achieved by means of a ball-hook and a ball-hook track. Whereas a baited hook takes up treble space as compared with an unbaited one a second object of the invention will be that of storing baited hooks on the selfsame deck surface as unbaited ones. This object is achieved by means of the track-wheel which takes thrice the number of tracks which are accommodated on a beam on the same surface on deck.

The track-wheel is based on the ball-fixture which permits the hook to be upside-down when the track is lowermost on the wheel without the hook becoming detached from the track.

FIG. 6 shows another composition of ball-hook 1 where there are two knobs or balls on the leg 1 and the track 10 is x-shaped, one of the balls being above and the other below centre. The track is in two sections as previously and the leg of the hook goes between these.

FIG. 7 shows the track 10 arranged on a supporting ring 9 which rests on supporting wheels 18 and side-wheels 17 which steer the wheel and carry side-forces upon the rolling of the vessel. Around the wheel the insulated housing 16 is fitted with air-cooling or spiral cooling equipment similar to a refrigerator. The space 20 within the wheel is storage space for the snoods 2 and the main-line 12. The front of the insulated housing has been removed in the Fig. There is an opening in it where the fishing line passes into the wheel and on the reverse side there is an opening where the fishing line passes out.

The ring 9 has cogs, holes or the like for the gripping of a rod end which forces it to turn 1 round while the long-line is laid or hauled.

The long-line is hauled on a hanging sheave 22 in a known manner along a track 15 from the baiting equipment to the storage track 10. The hook 1 follows the track 15, being pulled by the snood 2 and the main-line 12 as close as possible to the end of the track 10. From that position the hook is pushed by means of a pneumatically operated rod 21 over the remaining distance and into the track 10. This is shown in FIG. 8.

In order that the space 20 within the wheel 9 be utilized as well as possible and in order to reduce its size it is suitable to have the snoods shorter than usually, e.g. 30 centimeters.

In addition to the outfit described in the foregoing the invention consists of a new method for long-line fishing. The characteristics of the method are respresented by the operational order: Baiting—arranging—storing.

FIG. 8 furthermore shows the pressure wheels 23 and 24 which press the main-line 12 to the driving sheave 22. The rod 21 has a plate 25 which gives way to the snood 2.

I claim:

1. Long-line fishing gear for use with a baited hook storage assembly including,
    at least a pair of spaced apart rails presenting a track defined by opposed angular support surfaces on said rails,
    a long supporting main-line,
    a plurality of snoods attached to said main-line at selected intervals therebetween,
    a hook having a leg connected to each said snood,
    a protuberance fixedly mounted about each said hook leg and insertable into said track between said opposed rail support surfaces,
    said protuberance having an outer periphery defining a curved substantially uninterrupted continuous external surface presenting an indefinite number of contact points engageable with said spaced rail support surfaces whereby,
    upon baiting said hooks and inserting said protuberances within said track, said protuberance external surfaces permit free rotation of the baited hooks within said tracks to accommodate variation in the size and shape of bait carried by the plurality of hooks.

2. Long-line fishing gear according to claim 1 characterized by the fact that the surface of the knob is rounded in its contact points with the track although the leg of the hook be inclined in all directions on the angle arc tg $\mu$ where $\mu$ is the static frictional angle of the substance of the knob and the track or the inclination of the hook when the snood jerks it horizontally.

3. Long-line fishing gear according to claim 1 characterized by the fact that the knob is spherical.

4. Long-line fishing gear according to claim 1 characterized by the fact that the knob is disposed around the joint between the hook and the snood.

5. Long-line fishing gear according to claim 1 characterized by the fact that the hook is first tied in a to the snood and the knob is thereupon moulded around the knot.

6. Long-line fishing gear according to claim 1 characterized by the fact that the hook is first glued or fused to a snood of a single-strand material, and the knob is thereupon moulded around the leg and the snood and fused to both so that the knob transfers forces between the hook and the snood.

7. Long-line fishing gear according to claim 6 characterized by the fact that the hook has a spade, cogs, jags or the like, gripping like an anchor on the knob in order to increase its fastening to the hook.

8. Long-line fishing gear including,
    a long supporting main-line having snoods arranged at suitable intervals, each said snood fitted with a hook for bait and fish,
    a track adapted to support said hooks, said track defined by a pair of rail sections having a gap therebetween for the leg of said hooks and said snoods,
    a substantially spherical knob at the top of each said hook's leg,
    each said rail section forming a contact surface with said knob either above or below its centre, thus obstructing movement of the hook in the direction of the leg when said knob is disposed within said track and steering the knob in the direction of the track.

9. Long-line fishing gear according to claim 8 characterized by the fact that the right and left halves of the track are linked together by means of a connection lying on the outside of the hook and the bait thus forming a housing or passage for the hook and the bait.

10. Long-line fishing gear according to claim 9 characterized by the fact that parts of said track of suitable length are arranged side by side and form a ring or a wheel for the storage of the long-line.

11. Long-line fishing gear according to claim 10 wherein, said wheel rests on foundation wheels to permit revolving around its horizontal axis so that one part of the track after another shifts to a fixed part of the track, and baiting equipment disposed adjacent the track fixed part to allow baiting of said hooks prior to insertion of said knobs into said track.

12. Long-line fishing gear according to claim 11 wherein, said baiting equipment includes a fixed track extending to a track in said wheel, a driving sheave for the line disposed at a snood's length from said track and operable to pull said hooks to the wheel, a rod behind the hook and operable to push the hook over the last distance along the fixed track and into the entrance of the track in said wheel, said rod having a swinging head which presses on the snood, knob or hook on the way to the wheel, but leaves the hook on the way from the wheel.

13. Long-line fishing gear according to claim 10 including, an insulated housing surrounding said wheel and having openings at least at opposite ends thereof, and means cooling the interior of said housing.

* * * * *